United States Patent
Parker

(10) Patent No.: US 6,765,623 B1
(45) Date of Patent: Jul. 20, 2004

(54) METHOD AND APPARATUS FOR CORRECTING PHASE IMBALANCE IN RECEIVED IN-PHASE AND QUADRATURE SIGNALS

(75) Inventor: Jonathan Parker, Bath (GB)

(73) Assignee: Conexant Systems, Inc., Newport Beach, CA (US)

( * ) Notice: Subject to any disclaimer, the term of this patent is extended or adjusted under 35 U.S.C. 154(b) by 423 days.

(21) Appl. No.: 09/698,567

(22) Filed: Oct. 26, 2000

Related U.S. Application Data

(63) Continuation-in-part of application No. PCT/US00/10351, filed on Apr. 18, 2000.

(51) Int. Cl.[7] .............................. H04N 5/455; H03H 7/30
(52) U.S. Cl. ...................... 348/607; 348/726; 375/235
(58) Field of Search ............................... 348/607, 726, 348/638, 608, 609, 610, 611, 612, 639, 641, 727; 375/326, 316, 235, 347, 285; 455/295, 296

(56) References Cited

U.S. PATENT DOCUMENTS

| | | | | |
|---|---|---|---|---|
| 4,475,088 A | * | 10/1984 | Beard ........................... 331/25 |
| 5,105,195 A | * | 4/1992 | Conrad ......................... 342/174 |
| 5,157,697 A | * | 10/1992 | Anvari et al. ................. 375/102 |
| 5,263,196 A | * | 11/1993 | Jasper ........................... 455/324 |
| 5,369,411 A | * | 11/1994 | Lisle, Jr. ....................... 342/194 |
| 5,396,656 A | * | 3/1995 | Jasper et al. .................. 455/295 |
| 5,504,453 A | * | 4/1996 | MacDonald et al. ......... 329/304 |
| 5,757,861 A | * | 5/1998 | Lim .............................. 375/321 |
| 5,796,786 A | * | 8/1998 | Lee ............................... 375/326 |
| 5,802,121 A | * | 9/1998 | Hiramatsu .................... 375/368 |
| 5,848,099 A | * | 12/1998 | Benner ......................... 375/226 |
| 5,949,821 A | * | 9/1999 | Emami et al. ................ 375/235 |
| 6,044,112 A | * | 3/2000 | Koslov ......................... 375/235 |
| 6,122,325 A | * | 9/2000 | Mogre et al. ................. 375/261 |
| 6,163,563 A | * | 12/2000 | Baker et al. .................. 375/130 |
| 6,490,326 B1 | * | 12/2002 | Bastani et al. ............... 375/317 |
| 6,504,878 B1 | * | 1/2003 | Sparano ........................ 375/297 |

FOREIGN PATENT DOCUMENTS

| | | |
|---|---|---|
| EP | 0653858 | 5/1995 |
| EP | 0722235 | 7/1996 |
| EP | 0772331 | 5/1997 |
| WO | 9912305 | 3/1999 |

* cited by examiner

*Primary Examiner*—Michael H. Lee
*Assistant Examiner*—Paulos Natnael
(74) *Attorney, Agent, or Firm*—The Eclipse Group

(57) ABSTRACT

A method and apparatus that identifies the degree of correlation between a demodulated in-phase (I) and quadrature (Q) signal that represents phase imbalance between the in-phase (I) and quadrature (Q) signal and corrects the imbalance.

37 Claims, 7 Drawing Sheets

METHOD AND APPARATUS FOR CORRECTING PHASE IMBALANCE IN RECEIVED IN-PHASE AND QUADRATURE SIGNALS

CROSS REFERENCE TO RELATED APPLICATIONS

This application is a Continuation-In-Part (CIP) of co-pending PCT International Application No. PCT/US00/10351, filed on Apr. 18$^{th}$, 2000, which PCT application claims priority to Great Britain Application Number 9908909.6, entitled "Signal Correction," and filed on Apr. 19$^{th}$, 1999.

FIELD OF THE INVENTION

This invention relates to a method of signal correction, and to an apparatus for carrying out such correction. More specifically, the invention relates to the correction of nominal in-phase and quadrature received signals, in order to avoid errors that can arise when those received signals are other than exactly orthogonal. In particular, the invention is described with reference to a digital terrestrial television demodulator.

However, the same correction technique could be used in other systems and demodulators for any nominal in-phase and quadrature received signals, provided that, at the transmitter, the information contents on the in-phase and quadrature signals are not correlated, and provided that the signals are pseudo-random.

BACKGROUND OF THE INVENTION

As is well known, the European DVB-T (Digital Video Broadcasting—Terrestrial) standard for digital terrestrial television (DTT) uses Coded Orthogonal Frequency Division Multiplexing (COFDM) of transmitted signals. A DVB-T receiver therefore typically includes an analog tuner for receiving the signals and for down-converting to an intermediate frequency, an analog-digital converter, a digital demodulator, and an MPEG coder for producing output video signals. It will be realized that, although these different stages have been described, there can be overlap between the stages, and some or all functions can advantageously be combined onto a single chip.

Due to signal variations introduced by demodulation of the In-phase (I) and Quadrature (Q) signals in a monolithic (single-chip) integrated circuit (IC), used to mix a complex RF signal down to baseband, the I and Q signals can suffer from the following degradations:

(a) the I and Q signals are not exactly orthogonal (i.e., wherein they would have a 90° phase difference) but, rather, they have a phase difference which is 90°+Φ, where Φ is the phase imbalance in degrees; and (b) the I and Q signals have different gains, and this difference can be characterized by the ratio $R_G$ of the gain of Q to the gain of I ($R_G$=gain of Q/gain of I).

Typically Φ is on the order of one degree and $R_G$ is on the order of 0.1 dB.

The following mathematical treatment assumes that the gain imbalance is corrected "up front", and therefore that the system does not present a gain imbalance.

Recovery of an amplitude modulated signal may be achieved by multiplying the received signal by cos(ωt) and sin(ωt), and then low-pass filtering the resulting signals. In particular, if the transmitted signal s(t) is of the form:

$$s(t)=a\cdot\cos(\omega t)-b\cdot\sin(\omega t), \quad \text{Equation 1}$$

where a and b are the signals of interest that are to be recovered, and cos(ωt) and sin(ωt) are the carrier signals.

As is will be appreciated, s(t) can be demodulated to retrieve a and b by multiplying s(t) by cos(ωt) and sin(ωt), respectively, and then "low-pass filtering" to remove the double frequency term. For example, function a may be retrieved by multiplying s(t) by cos(ωt):

$$r(t)=s(t)\cdot\cos(\omega t) \quad \text{Equation 2}$$

Expanding s(t) using Equation 1 yields:

$$r(t)=a\cdot\cos^2(\omega t)-b\cdot\sin(\omega t)\cdot\cos(\omega t)$$

Using trigonometric identities, this becomes:

$$r(t) = \frac{a}{2} + \frac{a}{2}\cdot\cos(2\omega t) - \frac{b}{2}\cdot\sin(2\omega t)$$

After low-pass filtering to remove the double frequency term, we obtain:

$$r(t) = \frac{a}{2},$$

thus recovering function a.

Function b can be recovered in a similar manner by using sin(ωt) in place of cos(ωt) in Equation 2.

If the demodulating signals, cos(ωt) and sin(ωt), exhibit a phase imbalance, i.e., they each suffer a phase offset Φ, then they can be written as cos(ωt+Φ) and sin(ωt+Φ), respectively.

In the presence of a phase imbalance Φ, Equation 2 then becomes:

$$r_I(t)=s(t)\cdot\cos(\omega t+\Phi)$$

where $r_I(t)$ represents the in-phase component.

Expanding this equation using cos(A+B)=cos Acos B-sin Asin B, yields:

$$r_I(t)=(a\cdot\cos(\omega t)-b\cdot\sin(\omega t))(\cos(\omega t)\cdot\cos\Phi-\sin(\omega t)\cdot\sin\Phi)$$

then $$r_I(t)=a\cdot\cos^2(\omega t)\cdot\cos\Phi-a\cdot\cos(\omega t)\cdot\sin(\omega t)\cdot\sin\Phi-b\cdot\sin(\omega t)\cdot\cos(\omega t)\cdot\cos\Phi+b\cdot\sin^2(\omega t)\cdot\sin\Phi.$$

Using the following trigonometric identities:

$$\cos^2 x = \frac{1}{2}\cdot(\cos(2x)+1);\ \sin^2 x = \frac{1}{2}\cdot(1-\cos(2x));$$

$$\sin(x)\cdot\cos(x) = \frac{1}{2}\cdot\sin(2x);$$

we obtain:

$$r_I(t) = \frac{a}{2}\cdot(\cos(2\omega t)+1)\cdot\cos\Phi - \frac{a}{2}\cdot\sin(2\omega t)\cdot\sin\Phi -$$

$$b\cdot\sin(2\omega t)\cdot\cos\Phi + \frac{b}{2}\cdot(1-\cos(2\omega t))\cdot\sin\Phi;$$

Low-pass filtering to remove the 2ωt terms (double-frequency) finally yields the In-phase component:

$$I(t) = \frac{a}{2} \cdot \cos\Phi + \frac{b}{2} \cdot \sin\Phi \quad \text{Equation 3}$$

When recovering function b, we have:

$$r_Q(t) = s(t) \cdot \sin(\omega t + \Phi)$$

where $r_Q(t)$ represents the Quadrature component.
Expanding this equation using $\sin(A+B) = \sin A \cos B + \sin B \cos A$, gives:

$$r_Q(t) = (a \cdot \cos(\omega t) - b \cdot \sin(\omega t)) \cdot$$

$$(\sin(\omega t) \cdot \cos\Phi + \sin\Phi \cdot \cos(\omega t))$$

$$r_Q(t) = a \cdot \cos(\omega t) \cdot \sin(\omega t) \cdot \cos\Phi$$

$$+ a \cdot \cos^2(\omega t) \cdot \sin\Phi - b$$

$$\cdot \sin^2(\omega t) \cdot \cos\Phi - b$$

$$\cdot \sin(\omega t) \cdot \cos(\omega t) \cdot \sin\Phi;$$

$$r_Q(t) = \frac{a}{2} \cdot \sin(2\omega t) \cdot \cos\Phi + \frac{a}{2} \cdot (1 + \cos(2\omega t)) \cdot \sin\Phi -$$

$$\frac{b}{2} \cdot (1 - \cos(2\omega t)) \cdot \cos\Phi - \frac{b}{2} \cdot \sin(2\omega t) \cdot \sin\Phi.$$

Low-pass filtering to remove the $2\omega t$ terms (double-frequency) yields the quadrature component:

$$Q(t) = \frac{a}{2} \cdot \sin\Phi - \frac{b}{2} \cdot \cos\Phi \quad \text{Equation 4}$$

Equations 3 and 4 give the signals that will be retrieved in the I and Q outputs of a tuner with phase imbalance. If an estimate of $\Phi$ can be obtained, then Equations 3 and 4 form a system of two equations with two unknowns, that can readily be solved, providing perfect correction for the phase imbalance.

SUMMARY OF THE INVENTION

If an analog tuner is used to demodulate the signal into separate in-phase (I) and quadrature (Q) signals, then, typically, the generated I and Q signals are not always reliably separated by exactly 90° of phase, as they should be. When those signals are then provided as input to a demodulator, any phase imbalance will cause additional noise, due to cross-talk between the I and Q signals. This invention relates to a technique for correcting for any such imbalances.

In particular, the invention relies on an understanding that, if the phase difference between the received nominal in-phase and quadrature signals is anything other than exactly 90°, there will be a degree of correlation between the received signals. Moreover, the degree of correlation can be used as a measure of the amount of phase imbalance, allowing an appropriate correction to be applied so that the signals used for further processing are exactly orthogonal.

According to the invention, there are therefore provided a signal processor, and a receiver, which apply a correction to a received signal, based on a phase imbalance estimated from a measured degree of correlation between nominal in-phase and quadrature signals. In accordance with an exemplary embodiment of the present invention, a receiver correction device is provided. The receiver correction device includes an input for receiving detected in-phase and quadrature signal components, a phase estimator, for estimating a degree of correlation between the detected in-phase and quadrature signal components, and a correction circuit, for applying to at least one of the detected in-phase and quadrature signal components a correction factor, in order to reduce the degree of correlation between them.

The present invention also includes a method of processing a received signal in a radio frequency receiver. The method includes the steps of (1) receiving detected in-phase and quadrature signal components; (2) estimating a degree of correlation between the detected in-phase and quadrature signal components; and (3) applying to at least one of the detected in-phase and quadrature signal components a correction factor, in order to reduce the degree of correlation between them.

The present invention also relates to a method for estimating the value of the phase imbalance between In-phase (I) and Quadrature (Q) signals received by a receiver system. The method includes the steps of: (1) evaluating the correlation between the In-phase and Quadrature signals; and (2) determining the relationship between the correlation and the phase imbalance to thereby estimate the phase imbalance.

A device for estimating a value of the phase imbalance between In-phase and Quadrature signals received by a receiver system is also described. Finally, method of correcting phase and gain degradations that occur when processing a received signal are described.

BRIEF DESCRIPTION OF THE DRAWINGS

Like reference numbers and designations in the various drawings indicate like elements.

DETAILED DESCRIPTION OF THE INVENTION

The invention is described herein with reference to its application in the reception of digital terrestrial television (DTT) signals using the European DVB-T standard based on Coded Orthogonal Frequency Division Multiplexing (COFDM), although it shall be appreciated that its use is independent of the type of signals being received. Specifically, the invention can be applied to digital cable and digital television receivers using any suitable standard, and indeed to any receiver of nominal in-phase and quadrature received signals, provided that, at the transmitter, the information contents on the in-phase and quadrature signals are not correlated, and provided that the signals are pseudo-random.

Figure 1:
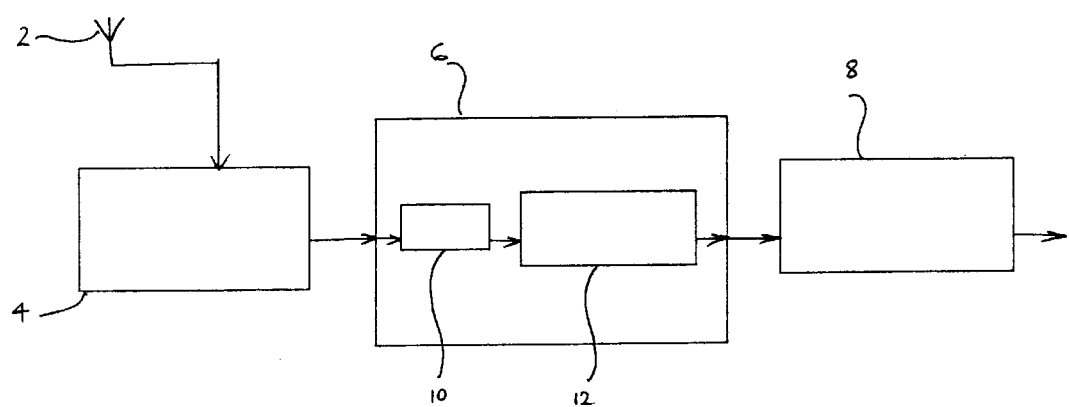
FIG. 1 is a simplified block diagram of a receiver device in accordance with the invention.

FIG. 1 is a simplified block diagram of a receiver made in accordance with the invention. FIG. 1 shows an antenna 2, for receiving broadcast signals, which are supplied as input to an analog tuner 4. The tuner 4 includes a mixer for down-conversion of the received signals to a first intermediate frequency, and an analog-digital converter, and supplies input signals to the demodulator 6 in the form of digitized samples of the nominal received in-phase (I) and quadrature (Q) signals. The demodulator 6 then removes the COFDM modulation, and supplies output signals to a coder 8, which converts the digital signals into a form suitable for display, for example based on the MPEG-2 standard. The form of the coder is generally known to those skilled in the digital communications art.

In accordance with the present invention, input signals received by the demodulator 6 are first transmitted to a pre-processor 10 (which is described in more detail below with reference to FIG. 2), and then to demodulation circuitry 12. The form of the demodulation circuitry is generally known those skilled in the digital communications art, and is therefore not described in more detail herein. Although FIG. 1 shows the receiver as being implemented as several discrete blocks, it shall be appreciated by those skilled in the art that the different processing blocks (shown in FIG. 1 as separate processing blocks) may be integrated, to the extent desirable, into a single integrated circuit (IC). Alternatively, other arrangements of functions can be used without departing from the scope or the spirit of the present invention. Moreover, the order of the stages can be selected as desired. For example, I and Q demodulation can take place in the analog domain or in the digital domain. Further, the A/D converter may be separate from the tuner.

Figure 2:
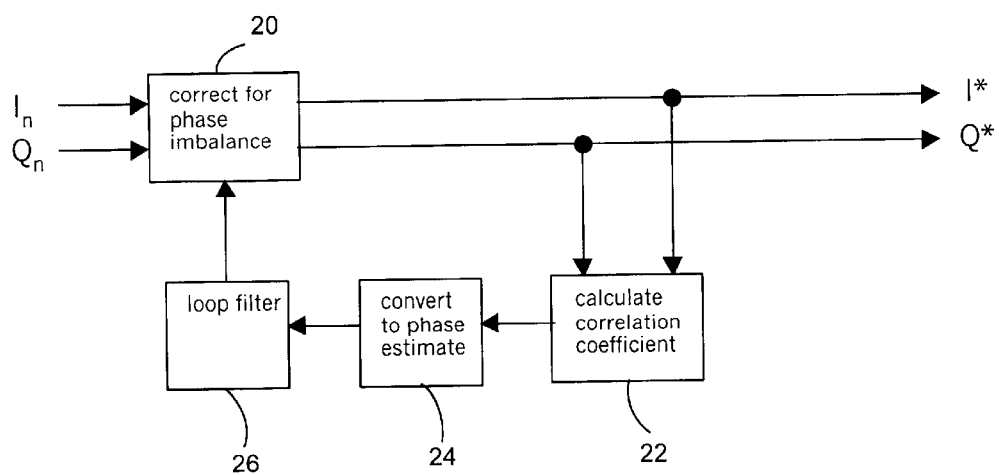
FIG. 2 is a simplified block diagram of a pre-processing circuit forming part of the receiver device of FIG. 1.

FIG. 2 is a simplified block diagram of the pre-processing stage 10 shown in FIG. 1. Again, FIG. 2 shows a number of discrete blocks, the functions of some or all of which may in fact be carried out together in, for example, a digital signal processor (DSP).

In an exemplary embodiment, the pre-processing stage 10 takes the form of a feedback loop, in which a correction is applied to the input signals, and the corrected signals are then used to analyze the requirement for further correction. As shown in FIG. 2, the pre-processing stage 10 receives digitized samples of the nominal in-phase and quadrature signals In, Qn, respectively, from the tuner 4 (FIG. 1). A correction for any detected phase imbalance is applied in a correction block 20, to yield corrected in-phase and quadrature output signals I*, Q*, respectively. These corrected signals are sampled, and provided as input to a correlation calculation block 22, which determines the degree of correlation between the corrected signals.

Because the In-phase and Quadrature signals should ideally be separated by exactly 90° of phase, they should be completely orthogonal. That is, there should be no correlation between the two signals. The correlation calculation block 22 can use any of several known measures of correlation. However, in one embodiment of the invention, it uses the linear correlation coefficient or "product-moment" correlation coefficient, also known as "Pearson's correlation coefficient". For each sample $x_i$, $y_i$ of the I and Q components (with the x values being samples from the I component signal, and y values being samples from the Q component signal), and with the mean values of x and y being $\bar{x}$ and $\bar{y}$ respectively, this coefficient, r, is defined as follows:

$$r = \frac{\Sigma_i (x_i - \bar{x})(y_i - \bar{y})}{\sqrt{\Sigma_i (x_i - \bar{x})^2} \sqrt{\Sigma_i (y_i - \bar{y})^2}} \quad \text{Equation 5}$$

In practice, an IIR filter may be used when implementing the calculation described by Equation 5. If the phase difference between the nominal in-phase and quadrature signals In and Qn is exactly 90°, as intended, the value of the correlation coefficient will tend, over a sufficiently large number of signal samples, towards zero.

As shown in FIG. 2, the measured value of the correlation coefficient is then supplied to a block 24, which uses the measured correlation coefficient to obtain an estimate of the phase difference between the corrected in-phase and quadrature signals I* and Q*. Any variation of this phase difference from 90° is described as a phase imbalance. For example, in one embodiment, block 24 includes a "look-up" table, in which the values of the coefficient corresponding to particular phase imbalances are stored. Because it is believed that the relationship between phase imbalance and correlation coefficient is substantially linear, block 24 may simply apply a scaling factor to the measured correlation coefficient to obtain an estimate of the phase imbalance. As shown in FIG. 2, the phase imbalance estimate is then supplied to a loop filter 26, which forms a stable estimate of the mean phase imbalance. This estimate is then provided as input to the correction block 20 as shown in FIG. 2.

In one embodiment where it is desired to simply apply a scaling factor to the measured correlation coefficient in order to obtain the estimated phase imbalance, this scaling factor may in fact be applied through the loop filter 26 without requiring a separate conversion block 24.

The required form of the correction can be illustrated by considering the input signal at time t, input(t)=A(t)+jB(t), with no phase imbalance. The signals A and B carry the required uncorrelated in-phase and quadrature input signals, respectively. This information can be recovered from a passband input signal by downmixing using orthogonal signals (sin and cos) to put the A and B signals onto orthogonal axes I and Q.

If there is a phase imbalance Φ, and if it is assumed that the recovered I axis is unaffected, the recovered Q axis is not exactly perpendicular to the recovered I axis. Rather, the angle between the recovered I and Q axes is (90°+Φ). In other words, the recovered Q axis is rotated by Φ with respect to the transmit Q axis. The signal on the recovered Q axis can be calculated by rotating the transmit axes by Φ and finding the component of the transmit signal along the received Q axis. The signal received on Q is then given by the following equation:

$$Q_{rx} = B \cdot \cos \phi - A \cdot \sin \phi$$

This equation can be solved to obtain the required value of B because the value of A is known from the received I signal Φ and (is the calculated phase imbalance. This correction can then be applied to the received nominal quadrature input signal Qn, to obtain the corrected quadrature signal Q*.

Alternatively, the recovered Q axis may be assumed to be unaffected. The recovered I axis is then rotated by Φ with respect to the transmit I axis, and the signal received on I is given by the following equation:

$$I_{rx} = A \cdot \cos \phi + B \cdot \sin \phi$$

This equation can be solved to obtain the required value of A because the value of B is known from the received Q signal, and Φ is the calculated phase imbalance. This correction can then be applied to the received nominal in-phase input signal In, to obtain the corrected in-phase signal I*.

Corrections may be applied on both the I and Q components. In practice, a correction on both I and Q may be desirable so that the quantization noise introduced by the correction, is the same on I and Q.

The implementation of the correction will desirably use very accurate arithmetic since the corrections may be very small, and could thus be close to the noise level. To decide whether or not the circuit will be of use one may have to carefully consider whether the required corrections are within the quantization noise of the input samples and also the additional noise added by a fixed point implementation of the required arithmetic operations.

This correction is of lower accuracy if there is also gain imbalance in the tuner, or elsewhere, that is, if the nominal in-phase and quadrature signals In, Qn have been subjected to slightly different gains. Specifically, the relationship between the phase imbalance and the correlation coefficient may not be directly proportional in the presence of a gain imbalance. The relationship may still be substantially linear, but not passing through the origin.

In the embodiment shown in FIG. 1, therefore, the pre-processor 10 also applies a gain correction to the nominal in-phase and quadrature signals In, Qn. More specifically, the variance of In and Qn can be estimated from individual samples thereof. Any difference between the variances can be taken to indicate a gain imbalance. The gain imbalance can then be used to apply a correction to the measured correlation coefficient before it is used to estimate the phase imbalance. Alternatively, automatic gain control (AGC) circuits may be used to remove any gain imbalance (between the nominal In-phase and Quadrature signals) before the correlation coefficient is calculated.

Assuming that the I and Q signals have similar "Probability Density Functions, and similar powers, separate yet similar AGC circuits can be applied to the I and Q signals (one to the I and the other to the Q signals) in order to equalize the powers. This can be done after the tuner and before the phase correction circuit. AGC circuits typically operate in a closed-loop configuration using an estimator of signal power to provide a feedback signal. The feedback signal is then "low-pass filtered" to reduce noise and provide the required response. Typically, the estimator estimates the signal variance. Another common method is to measure the amount of clipping. Both methods may be used depending on the type of input signal, without departing from the scope or the spirit of the present invention. After correction of the in-phase and quadrature components, the corrected components I*, Q* can be used by further processing stages of the demodulator.

Simulation Results

Figure 3:
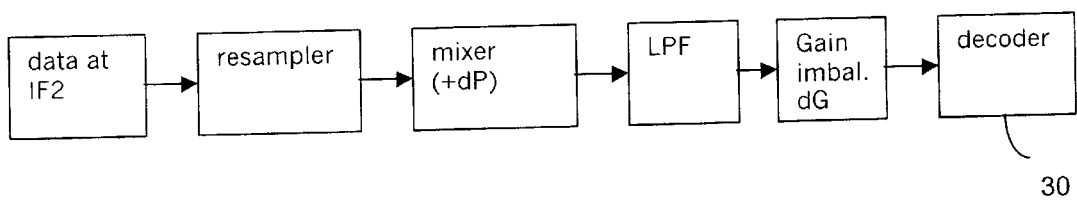
FIG. 3 illustrates a data flow used in an experimental simulation of a receiver made in accordance with the present invention.

FIG. 3 shows a data flow used in an experimental simulation of a receiver made in accordance with the present invention in which degradations are modeled at the input of the receiver using computer simulation. In the experimental simulation, a decoder 30 provides a merit value called PMER (Pilot Modulation Error Ratio) that is measured in dB. It represents a signal-to-noise ratio measured from the received constellation. The higher the value of the PMER, the less noise the receiver experiences. In the United Kingdom, for example, a PMER better than about 19 dB is required for DVB-T reception.

A first set of results, or coarse results, were obtained using data captured using a modulator to create the signal, an RF upconverter to raise the signal frequency to UHF, a tuner to receive the signal and a digital capture system to store the data to file. The noise floor associated with this data is on the order of 30 dB. Therefore, if the degradations had introduced noise at a level below this noise floor, they could not have been measured.

Figure 4A:
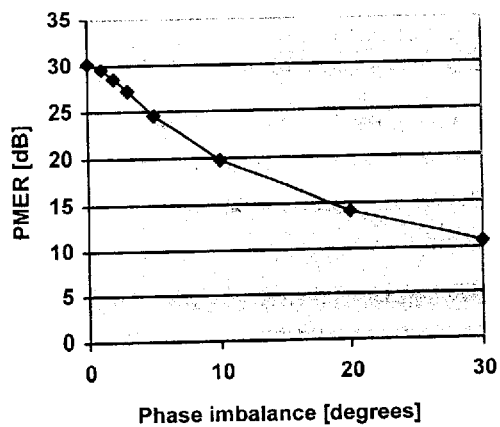
FIGS. 4a and 4b show the effect of phase and gain imbalance on DVB-T receiver performance, respectively, in connection with the simulation of FIG. 3.
Figure 4B:
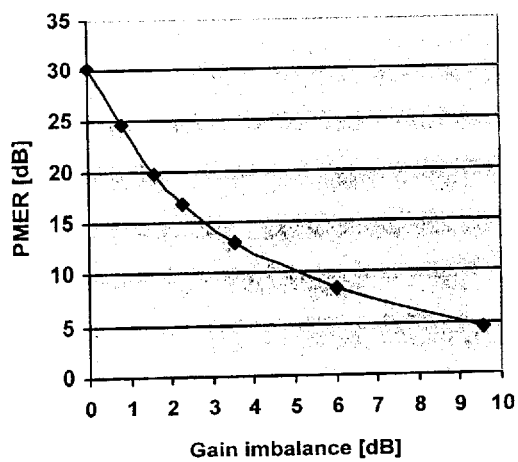

Turning to FIG. 4A, it appears that a phase imbalance of 1 degree introduces noise at a level of approximately 30 dB. If the tuner noise floor is at approximately 33 dB (−33 dBc), then the resulting system noise floor is at approximately 29 dB and the phase imbalance has brought the system noise floor up above the level that is specified in the "D-book" (Digital Television Group publication, "Digital Terrestrial Television: Requirements for Interoperability", DTG (Liss Mill, Hants, GU33 7BD, United Kingdom)). Thus, for DVB-T, small phase imbalances are corrected to maintain the system within D-book specification. As shown in FIG. 4b, gain imbalance appears to have a greater effect. Similarly, the gain imbalance may have to be removed.

The coarse results cover a greater range of degradations than is likely to occur in practice. Therefore, a second set of results, or fine results, was obtained using simulated input data with a much lower noise floor and focusing on the typical range of degradation values. Also investigated is the effect of using an 8 k COFDM system versus a 2 k COFDM system.

Figure 5A:
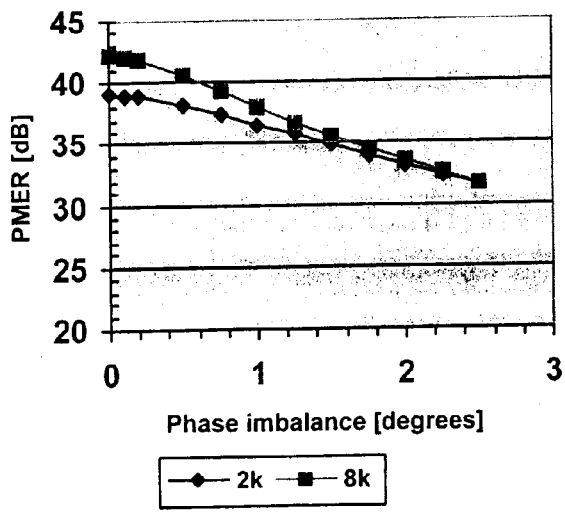
FIGS. 5a and 5b show the effect of phase imbalance and gain imbalance on DVB-T receiver performance, respectively, in connection with the simulation of FIG. 3.
Figure 5B:
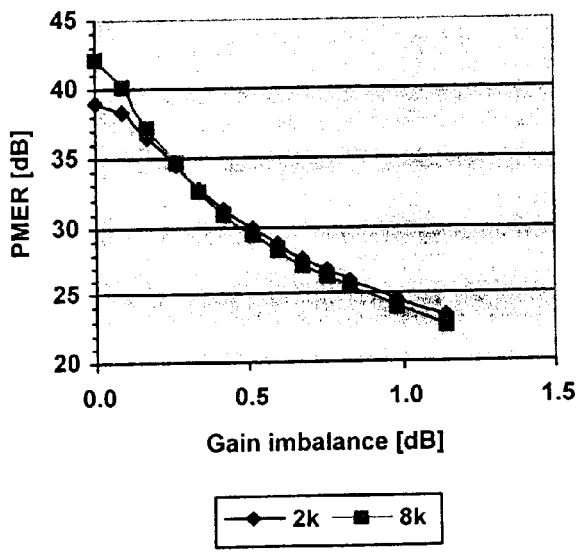

As shown in FIG. 5a, the 2 k system is more sensitive to phase imbalance than is the 8 k system. Turning to FIG. 5b, gain imbalance appears to have a similar effect on both the 2 k and 8 k systems. It seems reasonable to assume that negative imbalances have the same effect as positive imbalances.

Figure 6:
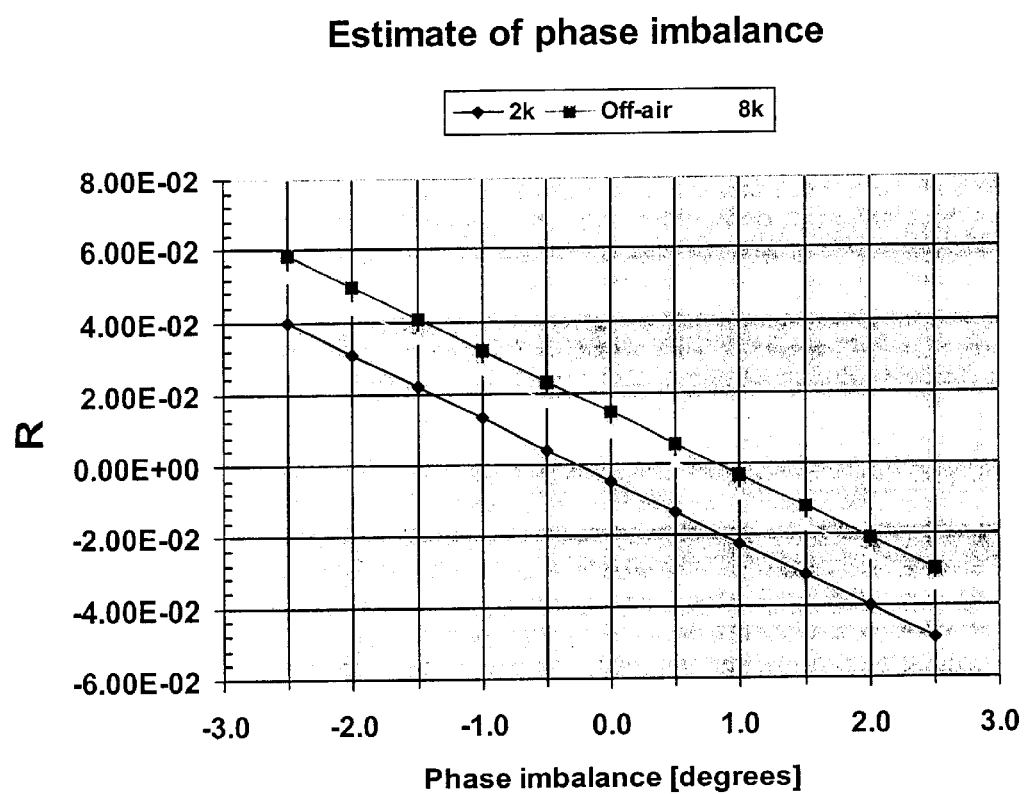
FIG. 6 is a graph illustrating an empirical relationship, derived from computer simulation, between correlation coefficient and phase imbalance.

For phase imbalance values no greater than a few degrees, the relationship between the correlation coefficient r and the phase imbalance was found to be substantially linear, as shown in FIG. 6. This figure illustrates a simulation from which a relationship between the correlation coefficient r and the phase imbalance, was derived empirically. The results of this simulation show a substantially linear relationship, as illustrated by the lines 60, 61 and 62 of FIG. 6. Methods of determining this relationship may include experimentation using mathematical formulae, software models, firmware, or hardware.

Results obtained by varying the relative gain of I and Q show that the value of the correlation coefficient r, does not change with gain imbalance. In fact, when varying the relative gain of I and Q, the correlation coefficient r maintains the values shown in FIG. 6 for a zero phase imbalance. In other words, gain degradation does not appear to affect r.

If it is assumed that the functions a and b of Equation I are uncorrelated, the noise due to phase imbalance may be evaluated. The contribution of b to the signal I(t) (Equation 3), or the contribution of a to the signal Q(t) (Equation 4), can then be considered as a source of noise. The carrier-to-noise ratio (CNR) is defined as the ratio of the power of the desired signal to the power of the noise. The overall CNR can be calculated by assuming that the I and Q signals carry equal CNR. The overall CNR is therefore the same as the CNR in one of either I or Q. It is also assumed that the total phase imbalance Φ, is equally divided between I and Q, so that each realizes an imbalance of Φ/2, and has equal noise sources.

If it is further assumed that the power in a and b was originally the same, then (in both the I and Q signals) the desired signal is cos Φ and the noise signal is sin Φ. Thus:

$$\text{ratio} = \left(\frac{\cos\Phi}{\sin\Phi}\right)^2 = \tan^{-2}$$

where $\Phi$ is half the total imbalance angle

Converting to dB, $$CNR(\Phi) := 20 \cdot \log\left(\frac{1}{\tan(\Phi)}\right) \quad \text{Equation 6}$$

Figure 7:
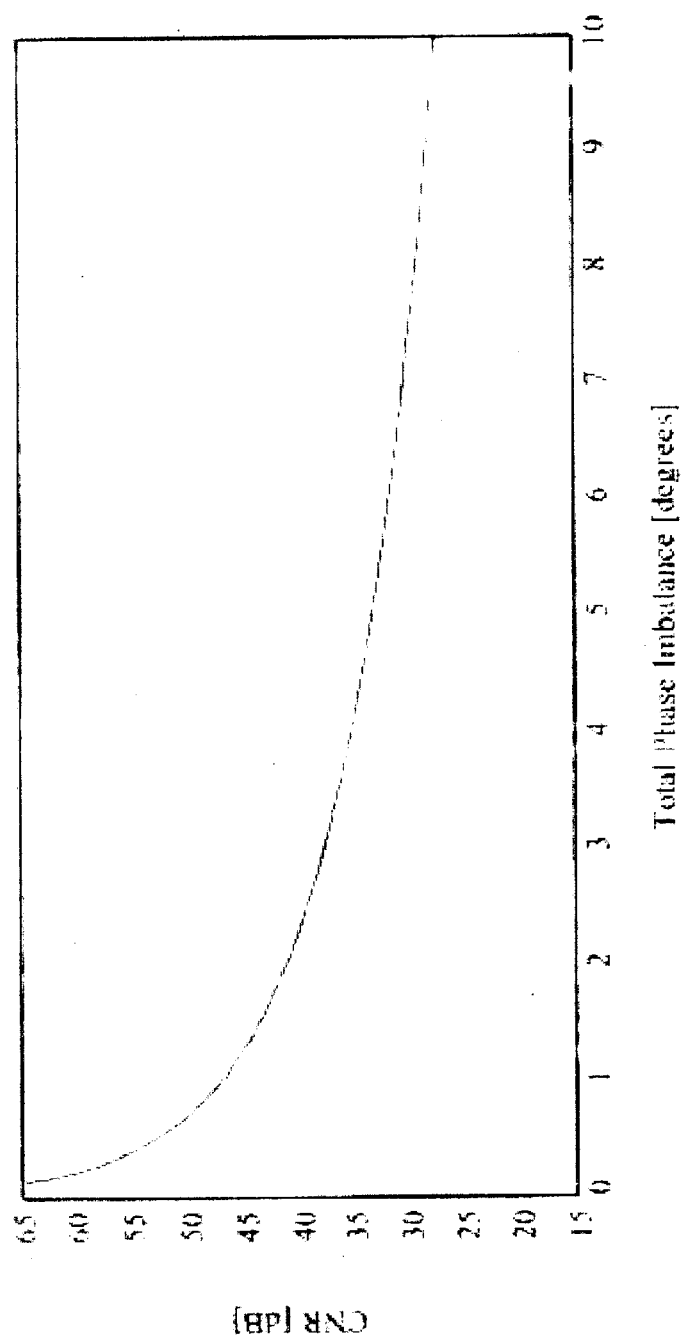
FIG. 7 is a graph showing Carrier-to-Noise Ratio (CNR) as a function of total phase imbalance.

The CNR can thus be calculated from the phase imbalance $\Phi$ using Equation 6. FIG. 7 shows the CNR as a function of the total phase imbalance, for values of the phase imbalance between 1° and 10°.

There is thus disclosed a system for removing noise components caused by phase imbalance resulting from the action of the tuner. A number of embodiments of the present invention have been described. Nevertheless, it will be understood that various modifications may be made without departing from the spirit and scope of the present invention. For example, although the present invention finds utility in digital terrestrial television receivers, and specifically those digital terrestrial television receivers that use Coded Orthogonal Frequency Division Multiplexing (COFDM) modulation schemes, the present invention may also be used in any receiver system that uses a monolithic analog zero-IF tuner. Such tuners, which are gaining more popularity, generate two orthogonal analog mixer signals. Due to manufacturing tolerances, the two orthogonal analog mixer signals generated by the zero-IF tuners have a phase imbalance and therefore are not orthogonal. This results in a degradation in noise performance of the demodulator. This degradation in the noise performance of the demodulator must be corrected in applications where noise performance is an important issue. For example, the degradation in the noise performance must be corrected when the degradation approaches or exceeds the tuner noise floor. The present invention can be used to correct such noise degradations in zero-IF tuners. Finally, although the present invention has been described above as finding utility in receivers using COFDM modulation schemes, other modulation schemes may be used in connection with the present inventive method and apparatus without departing from its scope or spirit. For example, one such modulation scheme contemplated for use with the present invention is the well known 8VSB modulation scheme used in the United States terrestrial digital television systems. In addition, the present invention also contemplates use in satellite receivers.

Accordingly, it is to be understood that the invention is not to be limited by the specific illustrated embodiments, but only by the scope of the appended claims.

What is claimed is:

1. A signal correction apparatus correcting phase imbalance in received in-phase (I) and quadrature (Q) signals in a receiver, where the receiver generates digitized samples of nominal received in-phase (I) and quadrature (Q) signals, comprising:

(a) a phase correction circuit receiving digitized samples of in-phase (I) and quadrature (Q) signals, wherein the phase correction circuit includes a phase imbalance detector wherein phase imbalance between the received I and Q signals is detected, and wherein the correction circuit generates corrected I and Q signals based upon the detected phase imbalance in the received I and Q signals;

(b) a correlation calculation circuit, coupled to the phase correction circuit, wherein the correlation calculation circuit determines a degree of correlation between the corrected I and Q signals;

(c) a phase estimator, coupled to the correlation calculation circuit, wherein the phase estimator estimates a phase difference between the corrected I and Q signals, (d) a loop filter, coupled to the phase estimator, wherein the loop filter generates a stable estimate of a mean phase imbalance between the corrected I and Q signals; and (e) wherein the correlation calculation circuit uses a linear correlation coefficient in determining the degree of correlation between the corrected I and Q signals and the linear correlation coefficient is represented by the variable r and is determined for each sample $x_i$, $y_i$ of the corrected I and Q signals, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\Sigma_i(x_i - \bar{x})(y_i - \bar{y})}{\sqrt{\Sigma_i(x_i - \bar{x})^2}\sqrt{\Sigma_i(y_i - \bar{y})^2}}.$$

2. A signal correction apparatus as defined in claim 1, wherein the apparatus is configured in a closed-loop configuration wherein the loop filter is coupled to the phase correction circuit, and wherein the phase correction circuit estimates the degree of correlation between the corrected I and Q signals after applying a correction factor thereto.

3. A signal correction apparatus as defined in claim 1, wherein the phase estimator includes a look-up table, and wherein the look-up table includes the plurality of correlation coefficients, each correlation coefficient having the associated predefined and corresponding unique phase imbalance value.

4. A signal correction apparatus as defined in claim 1, wherein a scaling factor is applied through the loop filter and wherein the phase estimator is bypassed.

5. A signal correction apparatus as defined in claim 1, wherein the receiver comprises a digital terrestrial television receiver.

6. A signal correction apparatus as defined in claim 5, wherein the receiver uses a Coded Orthogonal Frequency Division Multiplexing (COFDM) modulation scheme.

7. A signal correction apparatus as defined in claim 5, wherein the receiver uses an 8VSB modulation scheme.

8. A signal correction apparatus as defined in claim 5, wherein the receiver includes a monolithic analog zero-IF tuner.

9. A signal correction apparatus as defined in claim 1, wherein the receiver further includes a tuner circuit including a mixer and an analog-to-digital converter (ADC), wherein the mixer downconverters the received I and Q signals to a first intermediate frequency, and wherein the ADC generates the digitized samples of in-phase (I) and quadrature (Q) signals.

10. An apparatus correcting phase imbalance in received in-phase (I) and quadrature (Q) signals, comprising:

(a) means for correcting phase imbalance between received digitized samples of in-phase (I) and quadrature (Q) signals, wherein the phase correction means includes a phase imbalance detector wherein phase imbalance between the received I and Q signals is detected, and wherein the phase correction means generates corrected I and Q signals based upon the detected phase imbalance in the received I and Q signals;

(b) means, coupled to the phase correction means, for determining a degree of correlation between the corrected I and Q signals;

(c) means, coupled to the correlation determination means, for estimating a phase difference between the corrected I and Q signals;

(d) means, coupled to the phase difference estimating means, for generating a stable estimate of a mean phase imbalance between the corrected I and Q signals, and (e) a linear correlation coefficient is used by the means for determining the degree of correlation and is represented by the variable r that is determined for each sample $x_i$, $y_i$ of the corrected I and Q signals, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

11. A method of correcting phase imbalance in received in-phase (I) and quadrature (Q) signals, comprising:

(a) correcting phase imbalance between received digitized samples of in-phase (I) and quadrature (Q) signals, wherein the step of correcting phase imbalance includes: (1) detecting phase imbalance between the received I and Q signals, and (2) generating corrected I and Q signals based upon the detected phase imbalance;

(b) determining a degree of correlation between the corrected I and Q signals;

(c) estimating a phase difference between the corrected I and Q signals; and (d) generating a stable estimate of a mean phase imbalance between the corrected I and Q signals wherein a linear correlation coefficient is used in determining the degree of correlation and is represented by the variable r and is determined for each sample $x_1$, $y_i$ of the corrected I and Q signals, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

12. A receiver including a signal correction apparatus correcting phase imbalance in received in-phase (I) and quadrature (Q) signals, comprising:

(a) an analog tuner receiving analog broadcast signals modulated using a selected modulation scheme;

(b) a demodulator, coupled to the analog tuner, wherein the demodulator demodulates the analog broadcast signals using the selected modulation scheme, and wherein the demodulator includes a signal correction apparatus comprising:

(1) a phase correction circuit receiving digitized samples of in-phase (I) and quadrature (Q) signals, wherein the phase correction circuit includes a phase imbalance detector wherein phase imbalance between the received I and Q signals is detected, and wherein the correction circuit generates corrected I and Q signals based upon the detected phase imbalance in the received I and Q signals;

(2) a correlation calculation circuit, coupled to the phase correction circuit, wherein the correlation calculation circuit determines a degree of correlation between the corrected I and Q signals;

(3) a phase estimator, coupled to the correlation calculation circuit, wherein the phase estimator estimates a phase difference between the corrected I and Q signals; and (4) a loop filter, coupled to the phase estimator, wherein the loop filter generates a stable estimate of a mean phase imbalance between the corrected I and Q signals and wherein the correlation calculation circuit uses a linear correlation coefficient that is represented by the variable r and is determined for each sample $x_i$, $y_i$ of the corrected I and Q signals, respectively, and wherein mean values of the $x_i$, $y_i$ samples are represented by $\bar{x}$ and $\bar{y}$, respectively and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

13. The receiver as defined in claim 12, further including a coder coupled to the demodulator, wherein the coder converts the corrected I and Q signals into a format suitable for display thereof.

14. The receiver as defined in claim 13, wherein the format is compatible with an MPEG-2 standard.

15. The receiver as defined in claim 12, wherein the receiver comprises a digital terrestrial television receiver.

16. The receiver as defined in claim 12, wherein the selected modulation scheme comprises a Coded Orthogonal Frequency Division Multiplexing (COFDM) modulation scheme.

17. The receiver as defined in claim 12, wherein the selected modulation scheme comprises an 8VSB modulation scheme.

18. The receiver as defined in claim 12, wherein the tuner comprises a monolithic analog zero-IF tuner.

19. The receiver as defined in claim 12, wherein the tuner includes a mixer and an analog-to-digital converter (ADC) wherein the mixer downconverts the received I and Q signals to a first intermediate frequency, and wherein the ADC generates the digitized samples in-phase (1) and quadrature (Q) signals.

20. A signal correction apparatus, comprising:

(a) an input device receiving detected in-phase and quadrature signal components;

(b) a phase estimator estimating a degree of correlation between the detected in-phase and quadrature signal components; and (c) a correction circuit applying a correction factor to at least one of the detected in-phase and quadrature signal components; and (e) a linear correlation coefficient is used by the phase estimator and is represented by the variable r and is determined for each sample $x_i$, $y_i$ of the corrected I and Q signal, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

21. The signal correction apparatus as defined in claim 20, wherein the correction factor is applied to at least one of the detected in-phase and quadrature signals in order to minimize the degree of correlation between them.

22. The signal correction apparatus as defined in claim 21, further comprising a feedback loop, wherein the phase estimator estimates the degree of correlation between the detected in-phase and quadrature signal components after application of the correction factor thereto.

23. The signal correction apparatus as defined in claim 22, wherein the phase estimator estimates a phase imbalance from the estimated degree of correlation between the detected in-phase and quadrature signal components.

24. A method of processing a radio frequency signal, comprising:
   (a) receiving detected in-phase and quadrature signal components;
   (b) estimating a degree of correlation between the detected in-phase and quadrature signal components;
   (c) applying a correction factor to at least one of the detected in-phase and quadrature signal components and
   (d) wherein the estimating the degree of correlation uses a linear correlation coefficient that is represented by the variable r and is determined for each sample $X_i$, $y_i$ of the corrected I and Q signals, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

25. The method of processing a radio frequency signal as defined in claim 24, wherein the step of applying a correction factor to at least one of the detected in-phase and quadrature signal components is performed in order to reduce the degree of correlation between them.

26. The method of processing a radio frequency signal as defined in claim 24, wherein the degree of correlation between the detected in-phase and quadrature signal components is estimated after the correction factor is applied thereto.

27. The method of processing a radio frequency signal as defined in claim 24, wherein a phase imbalance is estimated from the degree of correlation between the detected in-phase and quad signal components.

28. The method of processing a radio frequency signal as defined in claim 24, further comprising:
   (a) receiving transmitted signals;
   (b) applying the transmitted signals to an analog-digital converter; and
   (c) downconverting the transmitted signals to form the in-phase and quadrature signal components.

29. A method of estimating a phase imbalance between in-phase and quadrature signals received by a receiver system, comprising:
   (a) evaluating a correlation between in-phase and quadrature signals;
   (b) determining a relationship between the correlation and phase imbalance of the in-phase and quadrature signals to thereby estimate the phase imbalance; and
   (c) a linear correlation coefficient is used when determining the relationship and is represented by the variable r and is determined for each sample $x_i$, $y_i$ of the corrected I and Q signals, respectively, and wherein mean values of the $x_i$, $y_i$ samples are represented by $\bar{x}$ and $\bar{y}$, respectively, and wherein the coefficient, r, is calculated in accordance with the following equation:

$$r = \frac{\sum_i (x_i - \bar{x})(y_i - \bar{y})}{\sqrt{\sum_i (x_i - \bar{x})^2} \sqrt{\sum_i (y_i - \bar{y})^2}}.$$

30. The method as defined in claim 29, wherein the correlation between the in-phase and quadrature signals is evaluated by calculating the correlation coefficient between the in-phase and quadrature signals.

31. The method as defined in claim 30, wherein the relationship between the correlation coefficient and the phase imbalance is empirically determined.

32. The method as defined in claim 31, wherein the correlation coefficient is Pearson's correlation coefficient, and wherein the calculation of the correlation coefficient is implemented using an IIR filter.

33. The method as defined in claim 29, wherein the receiver system is a digital television/cable receiver.

34. The method as defined in claim 33, wherein the digital television/cable receiver uses a Coded Orthogonal Frequency Division Multiplexing (COFDM) modulation scheme.

35. The method as defined in claim 33, wherein the digital television/cable receiver uses an 8VSB modulation scheme.

36. The method as defined in claim 29, wherein the receiver system is a satellite receiver system.

37. The method as defined in claim 29, wherein the receiver system includes a monolithic analog zero-IF tuner.

* * * * *